United States Patent
Campbell (10) Patent No.: US 10,369,467 B2
(45) Date of Patent: Aug. 6, 2019

(54) INTERACTIVE GAME SYSTEM

(71) Applicant: CINIME ASIA PACIFIC PTE. LTD., Singapore (SG)

(72) Inventor: Tom Campbell, London (GB)

(73) Assignee: CINIME ASIA PACIFIC PTE. LTD., Singapore (SG)

( * ) Notice: Subject to any disclaimer, the term of this patent is extended or adjusted under 35 U.S.C. 154(b) by 15 days.

(21) Appl. No.: 15/514,234

(22) PCT Filed: Sep. 25, 2015

(86) PCT No.: PCT/GB2015/052793
§ 371 (c)(1),
(2) Date: Mar. 24, 2017

(87) PCT Pub. No.: WO2016/046570
PCT Pub. Date: Mar. 31, 2016

(65) Prior Publication Data
US 2017/0296918 A1   Oct. 19, 2017

(30) Foreign Application Priority Data
Sep. 26, 2014   (GB) .................................. 1417073.2

(51) Int. Cl.
*A63F 13/44* (2014.01)
*A63F 13/77* (2014.01)
(Continued)

(52) U.S. Cl.
CPC ............ *A63F 13/44* (2014.09); *A63F 13/211* (2014.09); *A63F 13/213* (2014.09);
(Continued)

(58) Field of Classification Search
CPC ...... A63F 13/44; A63F 13/211; A63F 13/213; A63F 13/2145; A63F 13/215; A63F 13/27; A63F 13/28; A63F 13/327; A63F 13/35; A63F 13/42; A63F 13/77; A63F 13/92
See application file for complete search history.

(56) References Cited

U.S. PATENT DOCUMENTS

| 5,213,337 A | 5/1993 | Sherman |
| 7,702,608 B1 | 4/2010 | Bererton et al. |

(Continued)

FOREIGN PATENT DOCUMENTS

JP   2002-177648 A   6/2002

OTHER PUBLICATIONS

GB Search Report dated Jan. 27, 2016 and issued in GB Application No. 1417073.2 (1 page).

(Continued)

*Primary Examiner* — Jason Skaarup
(74) *Attorney, Agent, or Firm* — Nixon & Vanderhye P.C.

(57) ABSTRACT

The present invention relates to an interactive game system, including an audio output device; a video output device; and one or more controllers configured for receiving a synchronization signal via audio or video from the audio or video output device, for receiving input from a user of the controller responding to audio or video generated by the audio or video output device, and correlating the input to timing information pre-stored at the controller using the synchronization signal to determine game-play results. A method for providing an interactive game is also disclosed.

29 Claims, 6 Drawing Sheets

(51) Int. Cl.
*A63F 13/92* (2014.01)
*A63F 13/211* (2014.01)
*A63F 13/213* (2014.01)
*A63F 13/215* (2014.01)
*A63F 13/327* (2014.01)
*A63F 13/2145* (2014.01)
*A63F 13/27* (2014.01)
*A63F 13/28* (2014.01)
*A63F 13/35* (2014.01)
*A63F 13/42* (2014.01)

(52) U.S. Cl.
CPC ........ *A63F 13/215* (2014.09); *A63F 13/2145* (2014.09); *A63F 13/27* (2014.09); *A63F 13/28* (2014.09); *A63F 13/327* (2014.09); *A63F 13/35* (2014.09); *A63F 13/42* (2014.09); *A63F 13/77* (2014.09); *A63F 13/92* (2014.09)

(56) References Cited

U.S. PATENT DOCUMENTS

2009/0074235 A1* 3/2009 Lahr ................ G06F 17/30799
                                                    382/100
2011/0248915 A1  10/2011 Lu et al.
2012/0122580 A1   5/2012 Asami
2012/0209612 A1*  8/2012 Bilobrov ................ G11B 27/28
                                                    704/270
2013/0005482 A1*  1/2013 Kosta .................. G07F 17/3206
                                                     463/42
2014/0004934 A1*  1/2014 Peterson ............ G06Q 30/0209
                                                     463/29
2014/0201773 A1*  7/2014 Neumeier .......... H04N 5/44591
                                                     725/19
2014/0256432 A1   9/2014 Lockton et al.

OTHER PUBLICATIONS

International Search Report for PCT/GB2015/052793, dated Apr. 14, 2016, 6 pages.

Written Opinion of the ISA for PCT/GB2015/052793, dated Apr. 14, 2016, 13 pages.

"Kia launches interactive game that allows people to return high-speed tennis serve live from a TV", Campaign Brief Australia, Jan. 7, 2014, XP055242454.

* cited by examiner

INTERACTIVE GAME SYSTEM

This application is the U.S. national phase of International Application No. PCT/GB2015/052793 filed 25 Sep. 2015, which designated the U.S. and claims priority to GB Patent Application No. 1417073.2 filed 26 Sep. 2014, the entire contents of each of which are hereby incorporated by reference.

FIELD OF INVENTION

The present invention is in the field of interactive game systems. More particularly, but not exclusively, the present invention relates to an interactive game system which correlates user inputs to timing information.

BACKGROUND

Some interactive games rely on the player responding to visual or audio outputs in real-time. The success of the actions of the player are determined in relation to timings determined by the game system providing the interactive game.

To enable such real-time games, interactive game systems are designed with a central unit which generates visual and audio outputs and receive inputs from a controller. The controller is connected to the central unit via a protocol that facilitates real-time communication such as a wireless protocol (e.g. Bluetooth, wifi, and cellular data) or wired protocol (e.g. USB, serial, and Ethernet).

However, these interactive game systems have several limitations. For example, the player's controller must be in continuous communication with the central unit. This places constraints upon the nature of the player's controller, on the infrastructure for the interactive game system, and on the protocol for authenticating controllers with the interactive game system.

It is an object of the present invention to provide an interactive game system which overcomes the disadvantages of the prior art, or at least provides a useful alternative.

SUMMARY OF INVENTION

According to a first aspect of the invention there is provided an interactive game system, including:
An audio output device;
A video output device; and
One or more controllers configured for receiving a synchronisation signal via audio or video from the audio or video output device, for receiving input from a user of the controller responding to audio or video generated by the audio or video output device, and correlating the input to timing information pre-stored at the controller using the synchronisation signal to determine game-play results.

The controller may be further configured for displaying video output to the user of the controller relating to the game.

The controller may be further configured for receiving the timing information from a server and storing the timing information at the controller.

The input may be received at an accelerometer, gyroscope, and/or touch-screen at the controller.

The game-play results may be determined based on similarity between the timing of the input and the pre-stored timing information.

The pre-stored timing information may be generated from another controller receiving reference input from another user.

The synchronisation signal may be an audio watermark within an audio soundtrack.

The video output device may be a cinema screen and projector system, a computer display, or a television.

The audio output device may be a speaker or speaker system.

The controller may further comprise a microphone configured for receiving the synchronisation signal.

The controller may further comprise a camera configured for receiving the synchronisation signal.

To determine game-play results, the input may be correlated to both the pre-stored timing information and pre-stored response information. The pre-stored response information may include angular information, the timing of screen taps and/or the timing and direction of screen swipes.

The system may include a plurality of controllers.

The game-play results may be processed and displayed to the user of the controller. The processed game-play results may be displayed via the video output device.

The game-play results may be transmitted to a server. The game-play results for all of the controllers may be compared at the server.

The controller may be a portable computing device.

Feedback relating to the correlation between the input and the pre-stored timing information and/or pre-stored response information may be provided to the user via the controller such as via a visual display, haptic device, and/or audio output device at the controller.

The synchronisation signal may be an audio fingerprint and the controller may be further configured for detecting the audio fingerprint within audio received at the controller.

According to a further aspect of the invention there is provided a method of providing an interactive game within an interactive game system comprising an audio output device and/or a video output device, and one or more controllers, including:
At a controller:
  receiving a synchronisation signal in audio or video form from the audio or video output device;
  receiving input from a user of controller responding to audio or video generated by the audio or video output device; and
  determining game-play results by correlating the input with pre-stored information at the controller using the synchronisation signal.

According to a further aspect of the invention there is provided a method of providing an interactive game within an interactive game system comprising an audio output device and/or a video output device, and a plurality of controllers:
a. defining a synchronisation signal in an audio and/or video track for playback by the audio output device and/or the video output device; and
b. transmitting timing information relating to the interactive game to the plurality of controllers for storage at the controllers and for later use by the controllers to correlate to user input to determine game-play results.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides an interactive game system which utilises intelligent controllers synchronised with an audio and/or visual output using a broadcast channel, such as audio or video.

The invention uses a broadcasted synchronisation signal to enable a controller to correlate user inputs to pre-stored timing information to determine game-play results.

Figure 1:
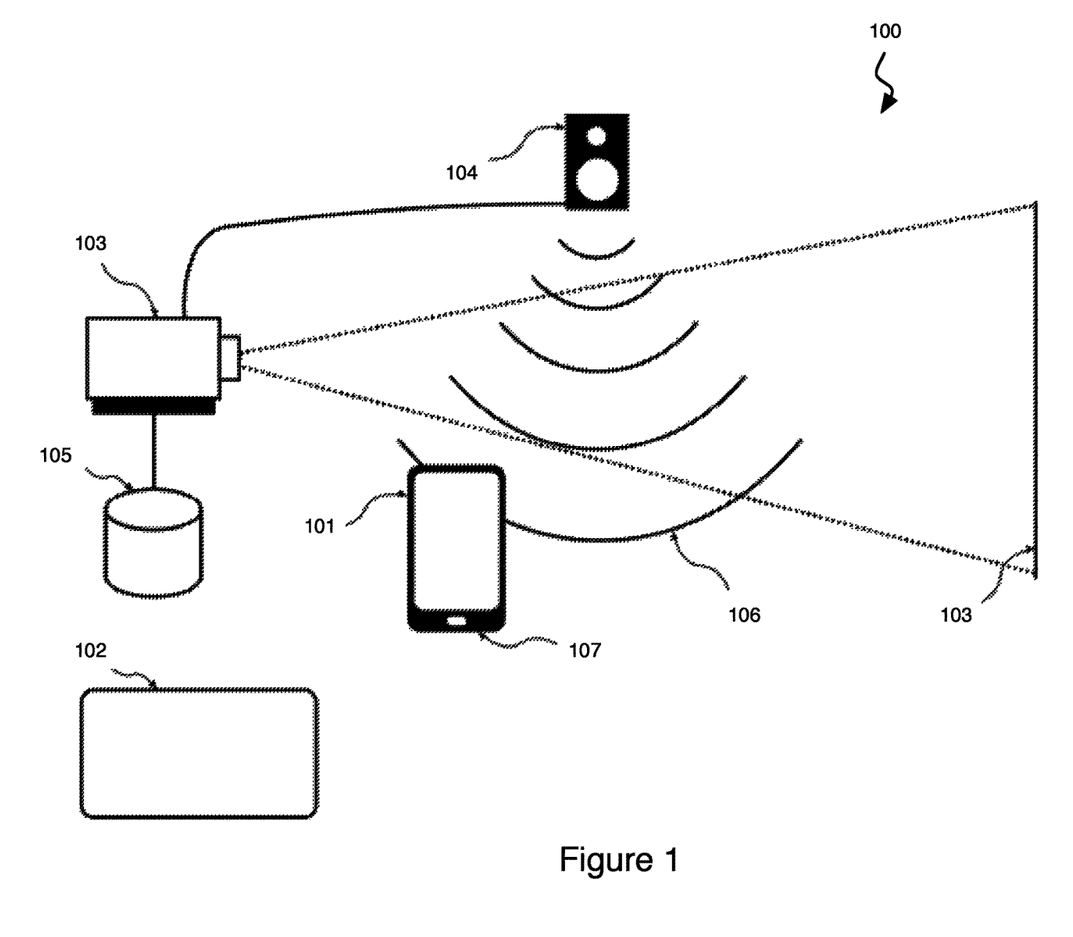
FIG. 1: shows a block diagram illustrating an interactive game system in accordance with an embodiment of the invention.

In FIG. 1, an interactive game system 100 in accordance with an embodiment of the invention is shown.

The system 100 comprises at least one controller 101. The controller 101 may be a portable user computing device, such as a smart-phone or tablet.

The system 100 may comprise a server 102 connected, at least periodically, to the controller 101. The server 102 may transmit timing information and game data to the controller 101 for storage and later use by the controller during a game.

The system 100 may comprise a video output device 103 such as a projector and screen system, television, computer display, or other video display.

The system 100 may comprise an audio output device 104 such as a speaker or speaker system such as a multi-speaker system.

The audio output device 104 may receive a synchronisation signal from a database 105. The synchronisation signal may be embedded within video, audio, and/or audio-visual tracks stored at the database 105 such as advertisements or movies. The synchronisation signal may be embedded as a water-mark within the tracks. The synchronisation signal may be an audio signal.

In an alternative embodiment, the audio output device 104 may receive the synchronisation signal from a processor which may generate the synchronisation signal in response to a computer program executing on the processor or in response to a signal received over a communications network.

The audio output device 104 may generate the synchronisation signal as audio 106.

In an alternative embodiment, the synchronisation signal is a video signal and is instead received and generated by the video output device 103.

The controller 101 may receive the synchronisation signal 106 generated by the audio output device 104 or video output device 103 at a microphone 107 or camera, respectively, at the controller 101.

The controller 101 may further comprise a user input device, such as a touch-screen; keypad; pointer device; accelerometer, gyroscope, or other motion detection mechanism; biofeedback; or any other user input mechanism.

The controller 101 may further comprise a processor configured to correlate user input received via the user input device with stored timing information to determine game-play results using the synchronisation signal. The controller 101 may further comprise an internal clock to facilitate the correlation.

Figure 2:
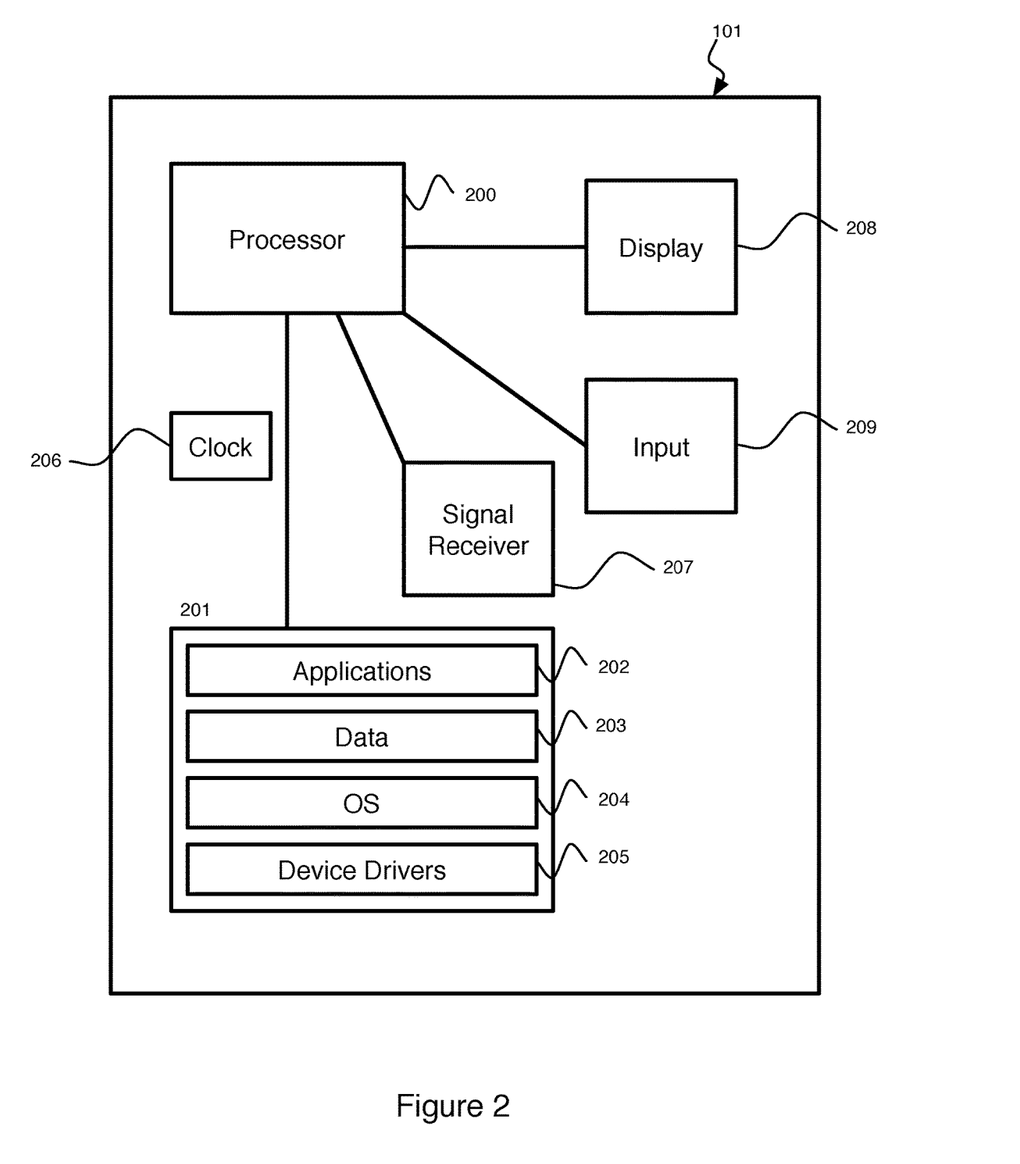
FIG. 2: shows a block diagram illustrating a controller for use with an interactive game system in accordance with an embodiment of the invention.

With reference to FIG. 2, a controller 101 for use with the interactive game system 100 above in accordance with an embodiment of the invention will be described.

The controller 101 may comprise a processor 200, a memory 201 configured for storing applications 202, data 203, the operating system 204 and device drivers 205, an internal clock 206, a signal receiver 207 such as a camera or microphone, a display 208 such as a touch-screen display or other electronic display, and a user input device 209. The user input device 209 may a touch controller for a touch-screen, an accelerator, a gyroscope, or any other means by which user input can be received and converted into digital form. It will be appreciated that the controller 101 may include multiple user input devices and that user input may be synthesised from inputs provided across a plurality of the user input devices (for example, input via both the accelerometer and gyroscope). The controller 101 may also include other output devices, such as a speaker and/or haptic device.

Figure 3:
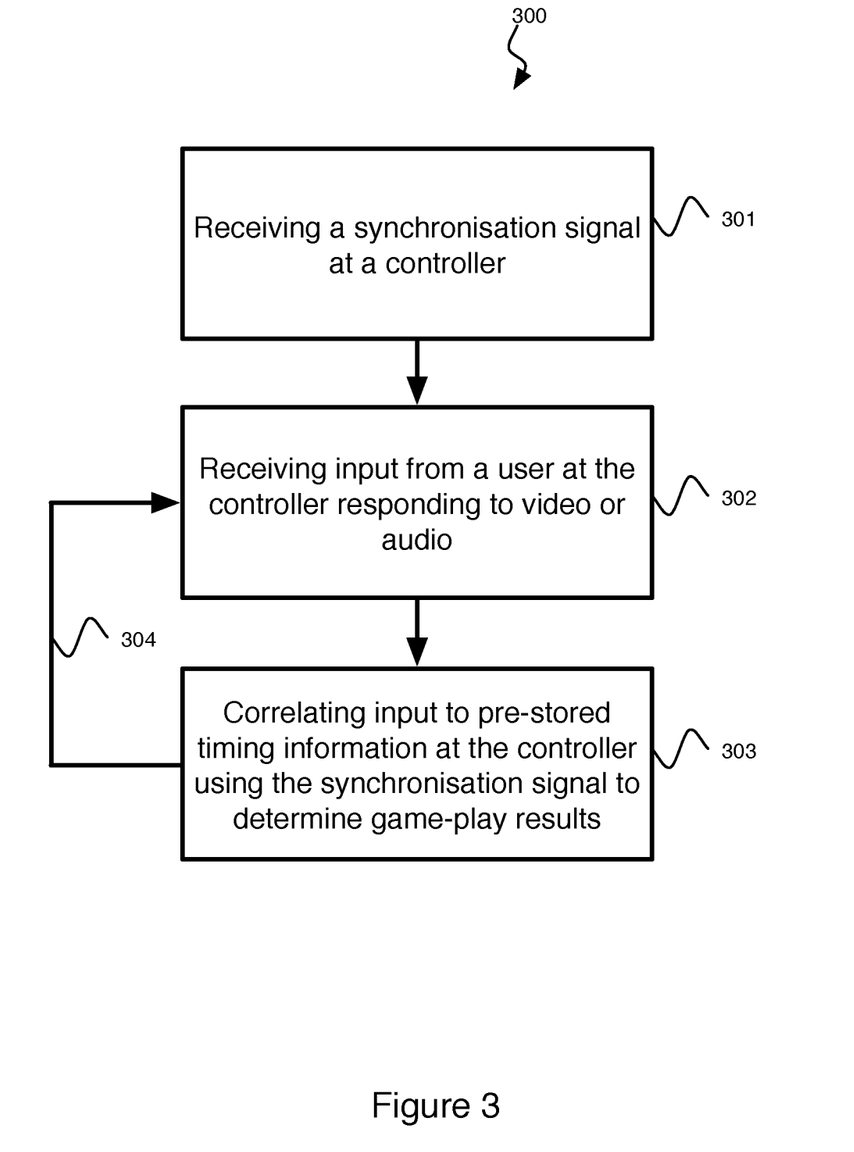
FIG. 3: shows a flow diagram illustrating a method in accordance with an embodiment of the invention.

The applications 202 may include a computer program for performing the method described in relation to FIG. 3.

The data 203 may include pre-stored timing information and pre-stored response information.

With reference to FIG. 3, a method 300 of providing a game within an interface game system will be described.

In step 301, a controller receives a synchronisation signal. The synchronisation signal may be audio, for example, from a speaker, or video, for example, from a cinema screen or video display. The synchronisation signal may be an audio watermark within an audio soundtrack played by the speaker.

In one embodiment, the synchronisation signal is an audio fingerprint defined within the sound-track. In this embodiment, the audio soundtrack is not modified.

Where the signal is audio, the controller may receive the signal at a microphone and, where the signal is video, the controller may receive the signal at a camera, such as a video camera.

In step 302, the controller receives input from a user. The input may be provided via a touch-screen at the controller, at a gyroscope and/or accelerometer at the controller, or any other input device at the controller.

The user may trigger the input responding to output displayed at a video output device (such as a cinema screen or video display) or generated at an audio output device (such as a speaker or speaker system). The output may be related to a game. For example, the user may be following instructions within the output to provide input at appropriate times, or the user may be following along to visual or audio actions by providing appropriate input at matching times.

In step 303, the controller correlates the input with pre-stored timing information to generate game-play results.

The controller may utilise the synchronisation signal to determine the beginning of the pre-stored timing information. An internal clock within the controller may be used to match the input from the user within pre-stored response information (e.g. receiving a tap/swipe at the touch-screen of the controller or receiving movement at the controller such as left or right movement of the controller) at timings defined by the pre-stored timing information. The closeness of the match may be used to generate a score for the user which is used to determine a game-play result for the user.

In one embodiment, when the synchronisation signal is an audio fingerprint, the controller detects the fingerprint within audio received at the microphone at the controller.

Feedback may be given to the user in response to the correlation between the input and the pre-stored timing information. In one embodiment, a display, audio output device, and/or haptic device at the controller may be used to deliver the feedback to the user; for example, to indicate a lack of correlation, the display may flash red, the audio output device may generate a beeping sound, and/or the haptic device may vibrate.

Steps 302 and 303 may repeat 304 such that the controller may receive further input from the user which is correlated to the pre-stored timing information.

Figure 4:
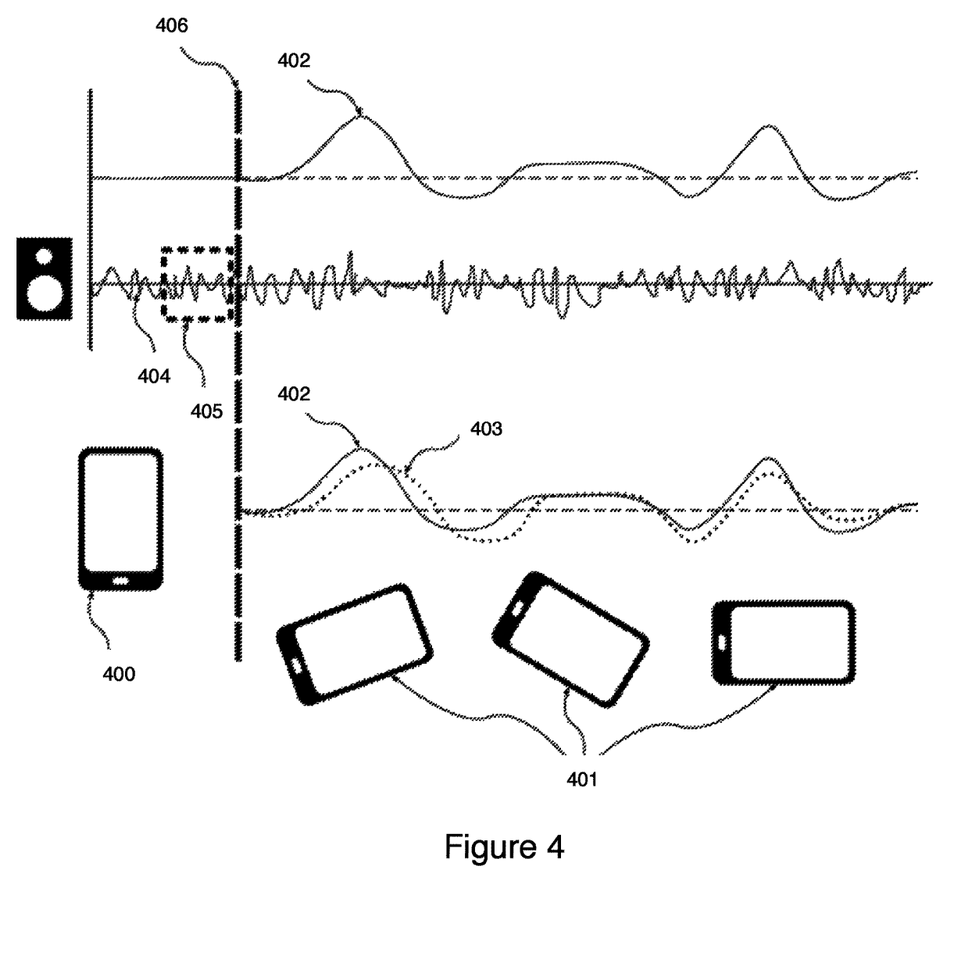
FIG. 4: shows a diagram illustrating a turning-style game in accordance with an embodiment of the invention.

With reference to FIG. 4, a steering or turning game within the interactive game system will be described. The steering or turning game may be a driving game, skiing game, flying game, cycling game, spaceship game, hover vehicle game or any other game where movement is conveyed in turning or leaning left or right.

This embodiment will be described where the game is a driving game. A video output device, such as the cinema projector and screen system, and audio output device, such as a cinema speaker system, plays a video of a racing car driving around a track for an advertiser. A player with an app on their smart-phone 400 (i.e. a controller) scores points by matching the steering wheel movements and angles by tilting their controller left and right, as shown at 401, at appropriate points in the video. At the end of the game, the player is shown their score on their controller 400 and may be awarded prizes from the advertiser.

The driving game uses pre-recorded master angular/time data 402 that is captured using a special version of the app. All players' score are calculated by how accurately players match their handset tilt movements in time with the video to this master data (the difference between 402 and 403). This movement data 402 is stored at the server and is loaded onto the player's handsets 400, for example, each time they start the app. Once the master data 402 is loaded on the handset, the game can be played without a network connection To play the game, the players' apps need to be time synchronized to the video and audio being projected in the cinema. The audio track 404 of the video is modified to include an inaudible audio watermark (AWM) data signal 405 that can be detected and decoded into binary data by the app on the player's controller 400. When the correct synchronisation code is detected, the app starts the game.

Once triggered at 406, the app on each player's handset 400 monitors the angle 403 of left right tilt of the handset 400 and compares it to the recorded movement data 402. The data items to compare against are calculated using a millisecond offset from the trigger 406. The difference between the recorded data 402 and the player's data 403 is used to score the player. For example, the player may acquire more points if the movement data 402 closely matches the current handset tilt angle 403.

Figure 5:
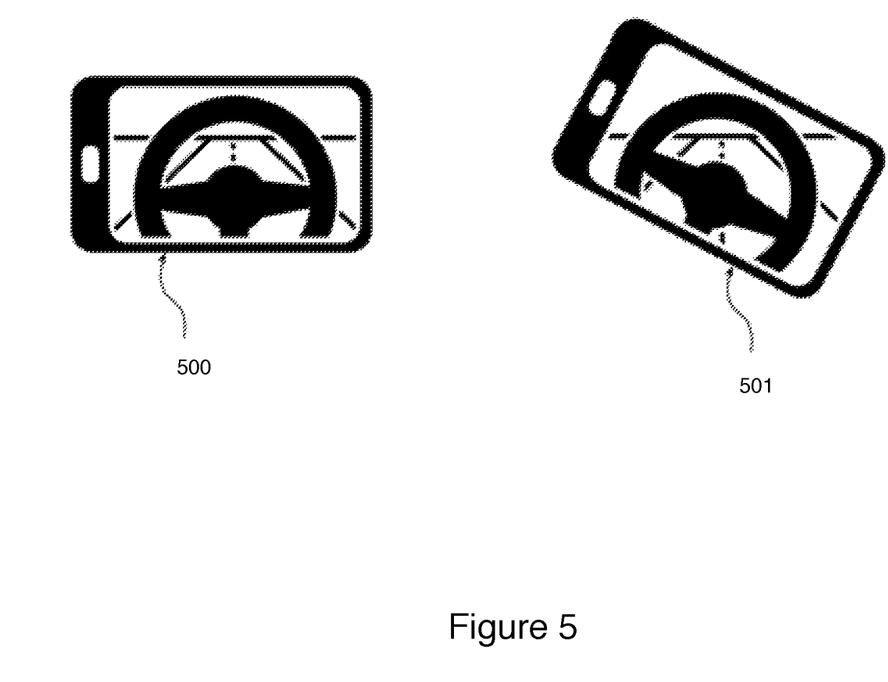
FIG. 5: shows a diagram illustrating feedback for a driving game in accordance with an embodiment of the invention.

With reference to FIG. 5, another embodiment of the steering or turning game within the interactive game system will be described.

This embodiment operates as described in FIG. 3 with the addition of visual feedback being provided to the user on the controller. When the controller is level, the steering wheel and road are shown aligned within a visual display on the controller as shown at 500, when the controller has been turned right (rotated clockwise) the steering wheel remains aligned with the display and the road is turned left (rotated counter-clockwise) within the display as shown at 501. It can be seen that the road is rotated to align with the user's "down" direction (typically the ground).

Figure 6:
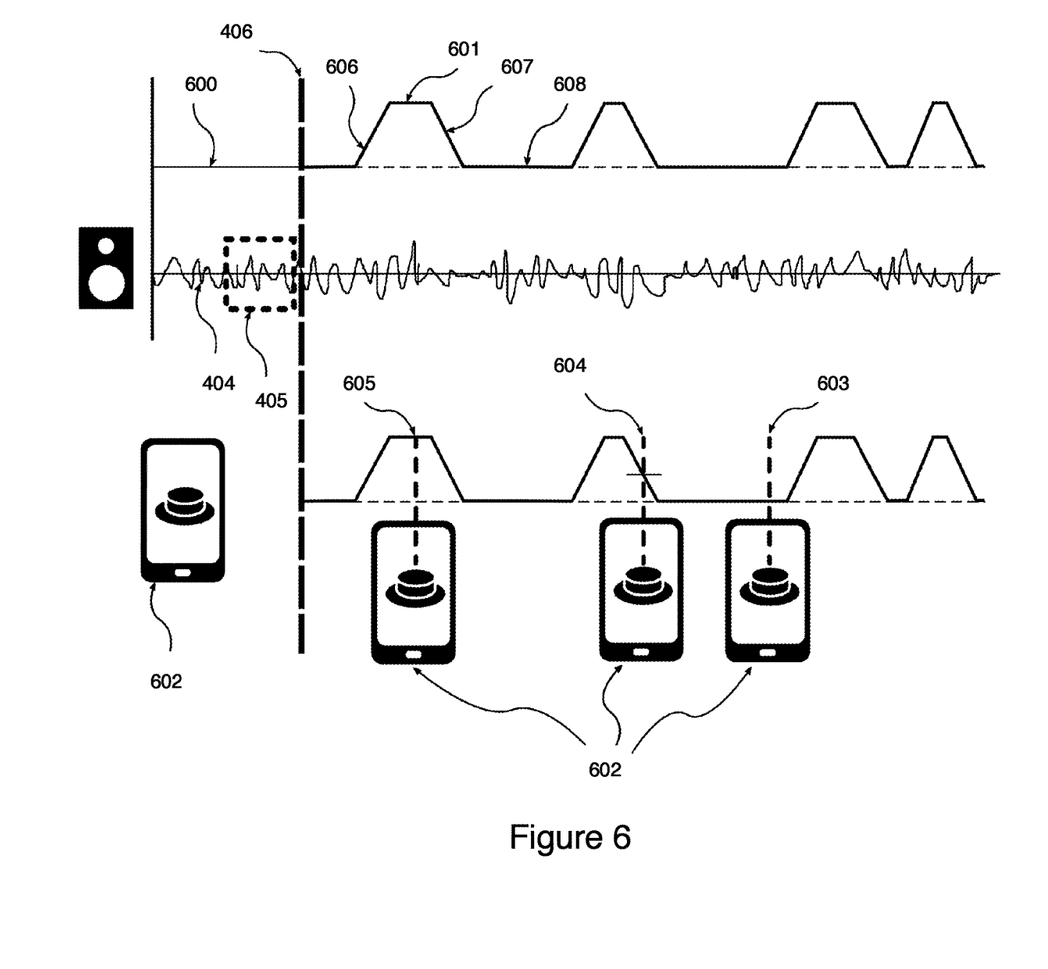
FIG. 6: shows a diagram illustrating a tapping-style game in accordance with an embodiment of the invention.

With reference to FIG. 6, a tap based game within the interactive game system will be described. The tap based game may be a sports game such as tapping to kick a ball to match an onscreen kicker, or tapping when a certain image generated by a video output device is displayed on a screen.

In one embodiment, tap input master timing data 600 can be used to test the player's ability to press a button on, for example, a touch-screen at the controller at a suitable time 601. This can be used to match the actions of someone onscreen such as a person kicking a ball. The player would try and tap the device 602 every time the ball is seen to be kicked in the video. A score can be calculated based on how close to the exact time the button was pressed. The player could tap when there is no kick on screen as shown at 603 and get penalised by losing points. Players could tap shortly before or after, as at 604, the on screen kick and get a low number of points. Or a player could tap during the kick to get the maximum score as at 605. The tap input master timing data 600 shows when the kick is made at 601, the lead up to the kick at 606, following the kick at 607, and when no kick is made at 608.

In another embodiment, other tapping may be on condition of the user seeing a specific object on the screen. For example, the player could score points every time the player taps the mobile device and there is a cat on the screen. The player scores a point if they manage to tap the device within the time slot that the cat appeared on the screen. In this case the data to compare against is a start and end time window and the player scores if their tap time is within these values.

In another embodiment, swipe input data at a touch-screen of the controller could be used to copy instructions given to a character onscreen. For example a pre-recording of a swipe based game, such as Temple Run, could be shown on the screen and the player must swipe left, right, up or down in unison with the recorded actions seen on the screen.

It will be appreciated that other input modalities or mechanisms could be used to receive user input.

Potential advantages of some embodiments of the present invention is that an interactive game system can onboard controllers owned by users (such as personal smart-phones) easily and with no or minimal onsite configuration, and accurate correlation of input timings and reference timings can be made without communication latency or interference problems.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. An interactive game system, including:
   an audio output device;
   a video output device; and
   one or more controllers, each controller including a processing system configured to:
      receive a synchronisation signal via audio from the audio output device or video from the video output device;

receive a plurality of inputs from a user of the controller responding to audio generated by the audio output device or video generated by the video output device; and correlate, using the synchronisation signal, the plurality of inputs to timing information pre-stored at the controller to determine game-play results.

2. An interactive game system as claimed in claim 1, wherein the controller is further configured for displaying to display video output to the user of the controller relating to the game.

3. An interactive game system as claimed in claim 1, wherein the input is received at an accelerometer, gyroscope, and/or touch-screen at the controller.

4. An interactive game system as claimed in claim 1, wherein the game-play results are determined based on similarity between the timing of the input and the pre-stored timing information.

5. An interactive game system as claimed in claim 1, wherein the pre-stored timing information is generated from another controller receiving reference input from another user.

6. An interactive game system as claimed in claim 1, wherein the synchronisation signal is an audio watermark within an audio soundtrack.

7. An interactive game system as claimed in claim 1, wherein the video output device is a cinema screen and projector system, a computer display, or a television.

8. An interactive game system as claimed in claim 1, wherein the audio output device is a speaker or speaker system.

9. An interactive game system as claimed in claim 1, wherein the controller further comprises a microphone configured to receive the synchronisation signal.

10. An interactive game system as claimed in claim 1, wherein the controller further comprises a camera configured to receive the synchronisation signal.

11. An interactive game system as claimed in claim 1, wherein, to determine game-play results, the input is correlated to both the pre-stored timing information and pre-stored response information.

12. An interactive game system as claimed in claim 11, wherein the pre-stored response information is one selected from the set of angular information, timing screen taps, and timing and direction of screen swipes.

13. An interactive game system as claimed in claim 1, wherein the system includes a plurality of controllers.

14. An interactive game system as claimed in claim 1, wherein the game-play results are processed and displayed to the user of the controller.

15. An interactive game system as claimed in claim 1, wherein the processed game-play results are displayed via the video output device.

16. An interactive game system as claimed in claim 1, wherein controller is configured to transmit the game-play results to a server.

17. An interactive game system as claimed in claim 16, wherein the game-play results for all of the controllers are compared at the server.

18. An interactive game system as claimed in claim 1, wherein the controller is a portable computing device.

19. An interactive game system as claimed in claim 1, wherein the controller is configured to provide, to the user via the controller, feedback relating to the correlation between the plurality of inputs and the pre-stored timing information and/or pre-stored response information.

20. An interactive game system as claimed in claim 19, wherein the feedback is provided via a visual display, haptic device, and/or audio output device at the controller.

21. An interactive game system as claimed in claim 1, wherein the synchronisation signal is an audio fingerprint and wherein the controller is configured to detect the audio fingerprint within audio received at the controller.

22. An interactive game system as claimed in claim 1, wherein the controller is configured to determine, based on the synchronisation signal, timing for a beginning of the pre-stored timing information.

23. An interactive game system as claimed in claim 1, wherein the controller includes an internal clock and the controller is configured to match, based on the internal clock, timing of the plurality of inputs to timing of pre-stored response information defined by the pre-stored timing information, and determining the game play results includes determining a score based on closeness of the match.

24. An interactive game system, including:
an audio output device;
a video output device; and
one or more controllers, each controller including a processing system configured to:
receive a synchronisation signal via audio from the audio output device or video from the video output device;
receive an input from a user of the controller responding to audio generated by the audio output device or video generated by the video output device; and
correlate, using the synchronisation signal, the input to timing information pre-stored at the controller to determine game-play results, wherein the controller is further configured to receive the timing information from a server and store the timing information at the controller.

25. A method of providing an interactive game within an interactive game system comprising an audio output device and/or a video output device, and one or more controllers, the method including:
at a controller:
receiving a synchronisation signal in audio form from the audio output device or video form from the video output device;
receiving a plurality of inputs from a user of controller responding to audio generated by the audio output device or video generated by the video output device; and
determining game-play results by correlating, using the synchronisation signal, the plurality of inputs with pre-stored information at the controller.

26. A controller comprising a processing system including a processor and memory, wherein the processing system is configured to:
receive a synchronisation signal via audio from an audio output device or video from a video output device;
receive a plurality of inputs from a user of the controller responding to audio generated by the audio output device or video generated by the video output device; and
correlate, using the synchronisation signal, the plurality of inputs to timing information pre-stored at the controller to determine game-play results.

27. A server for use with an interactive game system including an audio output device, a video output device, and a plurality of controllers, the server configured to:

defining a synchronisation signal in an audio and/or video track for playback by the audio output device and/or the video output device; and transmit timing information relating to the interactive game to the plurality of controllers for storage at the controllers and for later use by the controllers to correlate, using the synchronisation signal, a plurality of user inputs received at the respective controller to the timing information to determine game-play results.

28. A non-transitory computer-readable medium storing a computer program, when executed, causes a processing system of a controller to:

receive a synchronisation signal via audio from an audio output device or video from a video output device;

receive a plurality of inputs from a user of the controller responding to audio generated by the audio output device or video generated by the video output device; and correlate, using the synchronisation signal, the plurality of inputs to timing information pre-stored at the controller to determine game-play results.

29. A method of providing an interactive game within an interactive game system comprising an audio output device and/or a video output device, and a plurality of controllers, the method comprising:

a. defining a synchronisation signal in an audio and/or video track for playback by the audio output device and/or the video output device; and b. transmitting timing information relating to the interactive game to the plurality of controllers for storage at the controllers and for later use by the controllers to correlate, using the synchronisation signal, a plurality of user inputs received at the respective controller to the timing information to determine game-play results.

* * * * *